US009346469B2

(12) United States Patent
Glugla et al.

(10) Patent No.: US 9,346,469 B2
(45) Date of Patent: May 24, 2016

(54) METHOD AND SYSTEM FOR ENGINE AND POWERTRAIN CONTROL

(71) Applicant: Ford Global Technologies, LLC, Dearborn, MI (US)

(72) Inventors: Chris Paul Glugla, Macomb, MI (US); Michael Damian Czekala, Canton, MI (US); Garlan J. Huberts, Milford, MI (US); Douglas James McEwan, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 166 days.

(21) Appl. No.: 14/175,706

(22) Filed: Feb. 7, 2014

(65) Prior Publication Data

US 2015/0224997 A1    Aug. 13, 2015

(51) Int. Cl.
| | |
|---|---|
| *B60W 10/06* | (2006.01) |
| *B60W 10/10* | (2012.01) |
| *G06F 7/76* | (2006.01) |
| *B60W 50/06* | (2006.01) |
| *B60W 30/188* | (2012.01) |
| *F02D 41/24* | (2006.01) |
| *F16H 61/00* | (2006.01) |
| *F02D 41/26* | (2006.01) |
| *B60W 50/00* | (2006.01) |
| *G07C 5/00* | (2006.01) |

(52) U.S. Cl.
CPC ............... *B60W 50/06* (2013.01); *B60W 10/06* (2013.01); *B60W 10/10* (2013.01); *B60W 30/188* (2013.01); *F02D 41/2432* (2013.01); *F02D 41/2441* (2013.01); *F02D 41/2487* (2013.01); *F02D 41/266* (2013.01); *F16H 61/0006* (2013.01); *B60W 2050/0079* (2013.01); *B60W 2050/0083* (2013.01); *F02D 41/2464* (2013.01); *F02D 41/2467* (2013.01); *G07C 5/008* (2013.01)

(58) Field of Classification Search
CPC ...................................................... B60W 30/188
See application file for complete search history.

(56) References Cited

U.S. PATENT DOCUMENTS 5,884,210 A * 3/1999 Rettig ..................... B60K 31/16
180/167
6,553,301 B1 * 4/2003 Chhaya ..................... B60K 6/54
701/54

(Continued)

FOREIGN PATENT DOCUMENTS

| WO | 2012072926 A1 | 6/2012 |
| WO | 2012109742 A2 | 8/2012 |

(Continued)

*Primary Examiner* — Robert Hodge
*Assistant Examiner* — Tinh Dang
(74) *Attorney, Agent, or Firm* — Julia Voutyras; Alleman Hall McCoy Russell & Tuttle LLP

(57) ABSTRACT

Methods and systems are provided for expediting updating a vehicle's powertrain calibration table. The table is updated with data generated on-board a given vehicle while being matured with data downloaded from a cloud-based network, the downloaded data generated on-board one or more other vehicles having matching powertrain characteristics. Regions of a vehicle's calibration table where sufficient data is not generated on-board a given vehicle is populated with data from one or more other vehicles having sufficient data for those corresponding regions.

18 Claims, 6 Drawing Sheets

(56) References Cited

U.S. PATENT DOCUMENTS

| | | | | |
|---|---|---|---|---|
| 2006/0025894 A1* | 2/2006 | O'Connor | ............. | G01C 21/20 701/1 |
| 2007/0027592 A1* | 2/2007 | Tolkacz | ................ | B60R 25/102 701/29.6 |
| 2010/0305819 A1* | 12/2010 | Pihlajamaki | ......... | B60W 50/14 701/51 |
| 2012/0022764 A1* | 1/2012 | Tang | .................... | B60W 10/06 701/102 |
| 2013/0104064 A1* | 4/2013 | McCormick | ......... | G06F 3/0484 715/765 |
| 2013/0184966 A1* | 7/2013 | Lockwood | .............. | F02D 29/02 701/102 |
| 2014/0040434 A1* | 2/2014 | Rybak | .................... | G07C 5/008 709/219 |

FOREIGN PATENT DOCUMENTS

| | | |
|---|---|---|
| WO | 2013052698 A1 | 4/2013 |
| WO | 2013081657 A1 | 6/2013 |

\* cited by examiner

METHOD AND SYSTEM FOR ENGINE AND POWERTRAIN CONTROL

FIELD

The present application relates to systems and methods for improving calibration of engine and powertrain output.

BACKGROUND/SUMMARY

Engine control systems may use various calibration tables and maps to optimize engine and powertrain output as operating conditions change over a drive cycle. For example, vehicle systems may be pre-installed with engine maps that are used by the engine control system to determine how to schedule the various actuators. The calibration maps and tables may be populated with data gathered during engine and powertrain design, testing, and experimentation. In addition, engine control systems may be enabled to adapt and update the calibration tables with measurements and feedback data.

However, with powertrains and combustion engines becoming increasingly complex, there may be many degrees of freedom to optimize engine and powertrain output. For example, there may be various combinations of variable cam timing, variable induction system, variable valve lift, etc. that are possible. In engines with complex systems, it may take a significantly long time (e.g., more than a year of test time) to map out all the possible combinations of operation. Some vehicle systems may be configured to self-calibrate. Therein, in-cylinder pressure sensors may be used to self-calibrate the engine from a crude (initial) engine map. Since the combustion process is quite variable, multiple measurements have to be made at fairly steady state conditions to obtain reliable sensor output averages that can be used with confidence to update the engine map and to determine control actions. However, emissions fuel economy and drive traces tend to be transient in nature, spending little time at steady state conditions where adaptations could be made. As a result, self-calibrating vehicles may require many driving cycles to complete the calibration.

In another example, as shown by Lockwood et al. in US Patent Application 2013/0184966, data captured on-board a vehicle during engine operation can be processed by an on-board controller as well as by an off-board controller (such as an off-board cloud computing system). This allows for less computation intensive on-board processing of parameters (e.g., en masse adaptations) and concurrent more computation intensive off-board processing of parameters (e.g., individual adaptations). The concurrent processing allows for faster population of a calibration table while maintaining the processing power and memory configuration of the on-board vehicle control system.

However, the inventors herein have recognized that even with the self-calibration and the off-board processing, calibration tables may not be sufficiently populated in a time-efficient manner. In addition to the long times taken for the self-calibrating and off-board processing vehicles, there may be regions of the engine and powertrain calibration maps that remain insufficiently populated based on the vehicle operator's driving style. For example, aggressive drivers may have high speed and high load regions of their calibration maps well defined while other operating regions are not. As another example, a driver always operating in hot and dry climate regions may trot have sufficient calibration adaptations for wet and cold ambient conditions. As such, before a fuel economy test is performed, the vehicle has to adapt within a few drive cycles. Further, the calibration must be matured rapidly enough for the vehicle to pass emissions.

In one example, some of the above issues may be addressed by a method for an engine system comprising: adjusting data points of a vehicle powertrain calibration table using data collected on-board a vehicle and using data downloaded from an off-board network, the downloaded data collected on-board one or more other vehicles communicating with the network. The off-board network may be, for example, a cloud computing system. In this way, cloud calibration may be advantageously used to more fully populate engine calibration tables in a shorter amount of time.

For example, a first phase of cloud calibration may be performed during vehicle development by the manufacturer to achieve rapid calibration to pass all emissions requirements. Therein, a calibration table for a new vehicle, such as a new type (make or model) or new family of vehicles may be developed. Therein, before sale of the vehicle to a consumer, the calibration table may be populated with calibration data collected on-board a fleet of vehicles of the same make and model being developed and calibrated by the manufacturer. The calibration data collected on-board each vehicle in the fleet of vehicles may be uploaded to a cloud computing system. A controller of the individual vehicle may download the relevant data and rapidly update an initial calibration table of the vehicle.

A second phase of cloud calibration may be performed after the vehicle is in the customer's hands to further optimize vehicle performance for fuel economy, emissions, and driveability. The second phase of cloud calibration also accounts for component aging, wear and, enables diagnostic routines to be triggered as needed. Therein, the initial calibration table (the table the vehicle initially came with) may be updated. For example, a fleet of vehicles in use by respective consumers may collect calibration data under various operating conditions while traveling on the road. The calibration data from each vehicle of the fleet may be uploaded to a cloud computing system and stored there. In addition, calibration data for individual vehicles may be stored on their respective controller's memory. Each vehicle may then advantageously download data generated on-board other vehicles with matching powertrain characteristics to adapt or update their respective calibration tables. For example, a first vehicle may have sufficient on-board generated data corresponding to a first region of the given vehicle's powertrain calibration table. Accordingly, the vehicle's controller may populate the first region of the calibration table with the on-board collected data. Sufficient on-board data may be generated due to the first vehicle spending more than a threshold amount of time at operating conditions (e.g., speed-load conditions) corresponding to the first region of the calibration table. However, the first vehicle may have insufficient on-board generated data corresponding to a second, different operating region of the calibration table. Insufficient data may be generated due to the vehicle spending less than the threshold amount of time at operating conditions corresponding to the second region of the calibration table. Therefore, the controller may identify one or more other vehicles, such as a second vehicle, in the fleet having matching powertrain characteristics and whose calibration table has sufficient data populating the second region of the calibration table. As such, the discrepancy may be due to differences in driving habits between the operators of the first vehicle and the second vehicle. For example, the operator of the first vehicle may tend to perform longer highway trips while the operator of the second vehicle may tend to perform shorter in-city trips. Thus, while the first vehicle may have higher residence times at high speed and high load conditions, the second vehicle may have higher residence times at low speed and high load conditions. The controller of the first vehicle may then download the data collected on-board the second vehicle to populate the second region of its calibration table. Vehicle actuator adjustments for the first vehicle may then be performed based on the updated calibration table. Thus, the calibration table of a vehicle operated for long distance trips on the highway may be matured with data captured on a vehicle operated for short within city trips. As another example, the calibration tables of a vehicle operated in hot and dry weather conditions may be adjusted or "matured" with data captured on a vehicle operated in hot and humid weather conditions. As such, data pertaining to many different aspects of vehicle performance and adaptation may be used to improve vehicle operation.

In this way, full engine maps covering a larger number of degrees of freedom can be generated faster. By relying on data captured on-board one or more other vehicles having matching characteristics, calibration data pertaining to operating conditions and driving maneuvers not frequently experienced on a given vehicle can be imported from the other vehicles. By using the global data to populate the majority of operating conditions of a vehicle's calibration table, vehicle performance at those conditions can be improved. In addition, local adaptations can be used to fine tune the vehicle's performance. As such, this enables an average adaptation estimate to be provided faster while adapting for piece-to-piece variation by the individual vehicle more quickly. In addition, by using the data from one or more other vehicles during an initial phase of calibration table development, enough data samples may be provided for substantially all the speed-load points required for emissions testing. As such, this improves the confidence level of the data populating the vehicle's calibration table and increases the likelihood of the vehicle passing an emissions test. Overall, engine and powertrain calibration accuracy is improved, improving vehicle performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
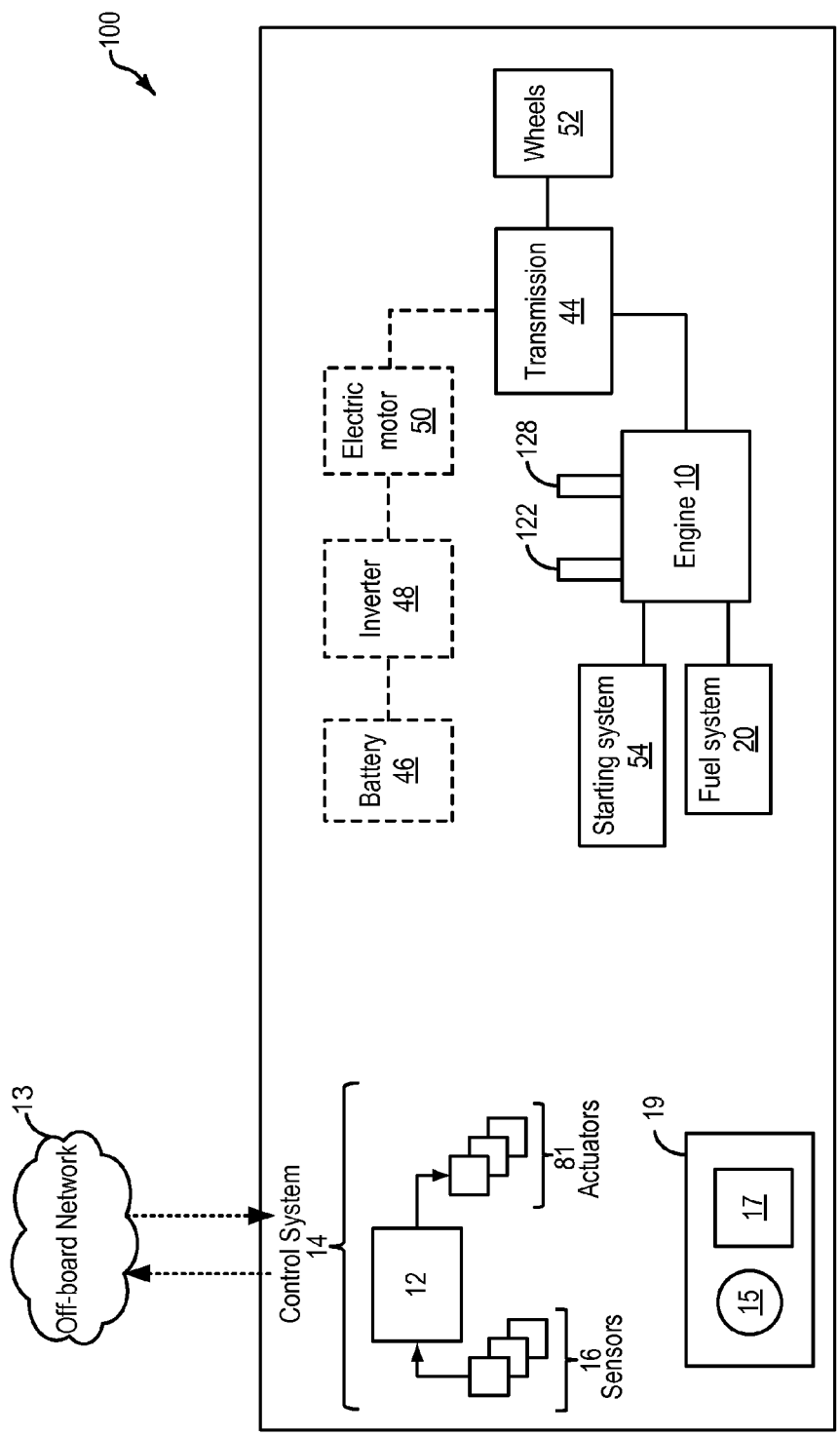
FIG. 1 schematically shows aspects of an example engine system in accordance with an embodiment of this disclosure.
Figure 2:
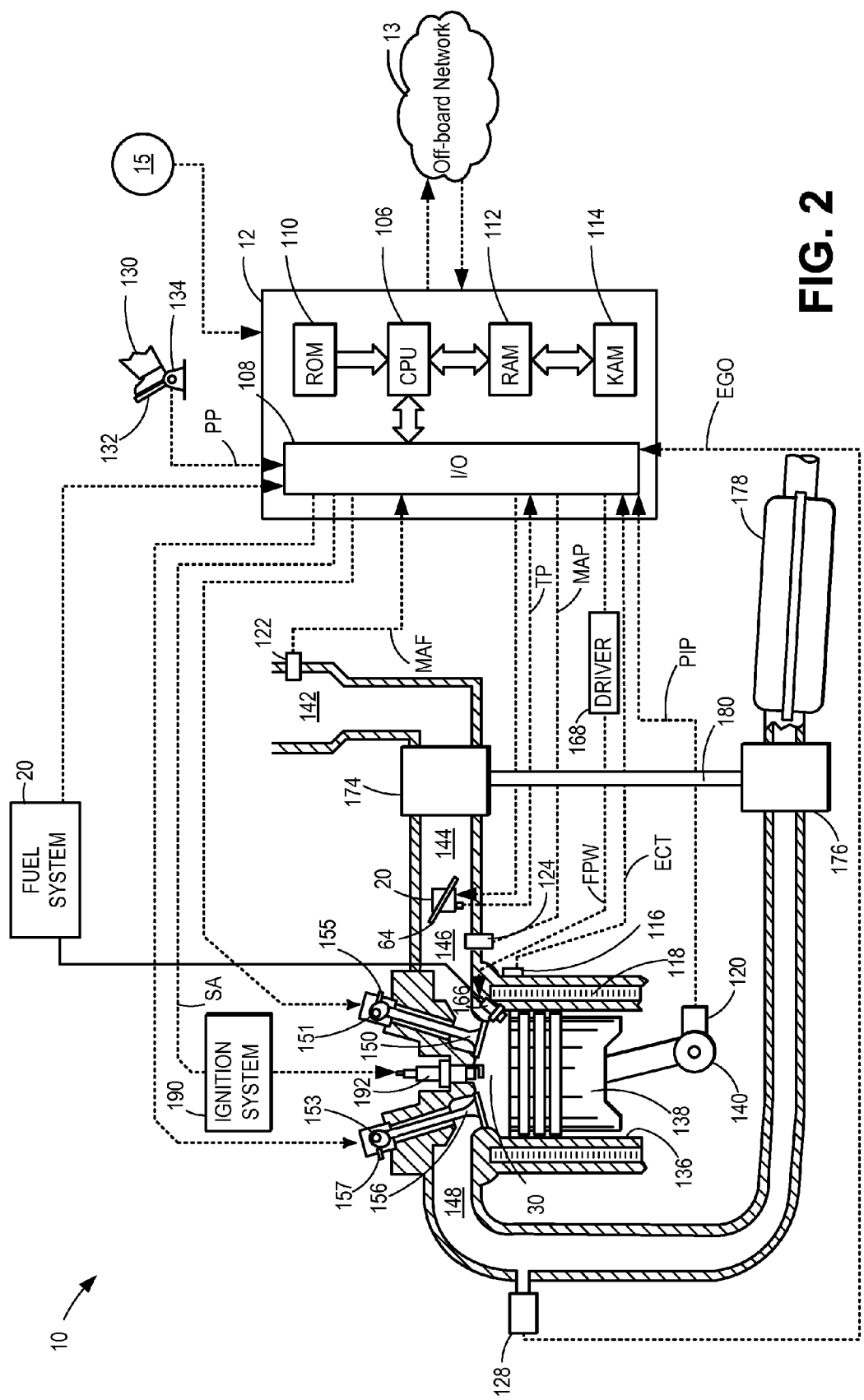
FIG. 2 shows a partial engine view.

Methods and systems are provided for expediting updating of one or more calibration tables used for optimizing powertrain output in a vehicle system, such as the vehicle system of FIG. 1. In one non-limiting example, the engine may be configured as illustrated in FIG. 2, wherein the engine includes at least one cylinder, a control system, a turbocharger, and an exhaust gas recirculation system, among other features. An engine controller may be configured to perform a control routine, such as the routine of FIGS. 3-5 to update a vehicle calibration table based on on-board data and/or off-board network data, and optimize vehicle powertrain output based on the updated calibration table. The off-board network data may be downloaded from an off-board network system depicted at FIGS. 1-2. An example adaptation of a vehicle calibration table is shown at FIG. 6.

FIG. 1 depicts a vehicle system 100 including an internal combustion engine 10 coupled to transmission 44. Engine 10 may be started with an engine starting system 54, including a starter motor. Transmission 44 may be a manual transmission, automatic transmission, or combinations thereof. Transmission 44 may include various components such as a torque converter, a final drive unit, a gear set having a plurality of gears, etc. Transmission 44 is shown coupled to drive wheels 52, which may contact a road surface.

In one embodiment, vehicle system 100 may be a hybrid vehicle wherein transmission 44 may alternatively be driven by an electric motor 50. For example, the motor may be a battery-powered electric motor (as depicted) wherein electric motor 50 is powered by energy stored in battery 46. Other energy storage devices that may be used to power motor 50 include a capacitor, a flywheel, a pressure vessel, etc. An energy conversion device, herein inverter 48, may be configured to convert the DC output of battery 46 into an AC output for use by electric motor 50. Electric motor 50 may also be operated in a regenerative mode, that is, as a generator, to absorb energy from vehicle motion and/or the engine and convert the absorbed energy to an energy form suitable for storage in battery 46. Furthermore, electric motor 50 may be operated as a motor or generator, as required, to augment or absorb torque during a transition of engine 10 between different combustion modes (e.g., during transitions between a spark ignition mode and a compression ignition mode).

When configured in the hybrid embodiment, vehicle system 100 may be operated in various modes wherein the vehicle is driven by only the engine, only the electric motor, or a combination of both. Alternatively, assist or mild hybrid modes may also be employed, wherein the engine is the primary source of torque, and the electric motor selectively adds torque during specific conditions, such as during a tip-in event. For example, during an "engine-on" mode, engine 10 may be operated and used as the primary source of torque for powering wheels 52. During the "engine-on" mode, fuel may be supplied to engine 10 from fuel system 20 including a fuel tank. The fuel tank may hold a plurality of fuels, such as gasoline, or fuel blends, such as fuel with a range of alcohol (e.g., ethanol) concentrations including E10, E85, etc., and combinations thereof. In another example, during an "engine-off" mode, electric motor 50 may be operated to power the wheels. The "engine-off" mode may be employed during braking, low speeds, while stopped at traffic lights, etc. In still another example, during an "assist" mode, an alternate torque source may supplement and act in cooperation with the torque provided by engine 10.

Vehicle system 100 may further include control system 14. Control system 14 is shown receiving information from a plurality of sensors 16 and sending control signals to a plurality of actuators 81. The control system 14 may further include a controller 12. The controller may receive input data from the various sensors or buttons, process the input data, and trigger the actuators in response to the processed input data based on instruction or code programmed therein corresponding to one or more routines. Example control routines are described herein with regard to FIGS. 3-5.

The vehicle control system may be communicatively coupled to an off-board network 13 such as a cloud computing system via wireless communication, which may be Wi-Fi, Bluetooth, a type of cellular service, or a wireless data transfer protocol. As such, this connectivity where the vehicle data is uploaded, also referred to as the "cloud", may be a commercial server or a private server where the data is stored and then acted upon by optimization algorithms. The algorithm may process data from a single vehicle, a fleet of vehicles, a family of engines, a family of powertrains, or a combination thereof. The algorithms may further take into account the system limitations, produce calibration data for optimizing powertrain outputs, and send them back to the vehicle(s) where they are applied.

Vehicle system 100 may also include an on-board navigation system 17 (for example, a Global Positioning System) on dashboard 19 that the operator can interact with. The navigation system may include one or more location sensors for assisting in estimating a location (e.g., geographical coordinates) of the vehicle. Dashboard 19 may further include an operator ignition interface 15 via which the vehicle operator may adjust the ignition status of the vehicle engine. Specifically, the operator ignition interface may be configured to initiate and/or terminate operation of the vehicle engine based on an operator input. Various embodiments of the operator ignition interface may include interfaces that require a physical apparatus, such as an active key, that has to be inserted into the operator ignition interface to start the engine and turn on the vehicle, or be removed to shutdown the engine and turn off the vehicle. Other embodiments may include a passive key that is communicatively coupled to the operator ignition interface. The passive key may be configured as an electronic key fob or a smart key that does not have to be inserted or removed from the ignition interface to operate the vehicle engine. Rather, the passive key may need to be located inside or proximate to the vehicle (e.g., within a threshold distance of the vehicle). Still other embodiments may additionally or optionally use a start/stop button that is manually pressed by the operator to start or shutdown the engine and turn the vehicle on or off. Based on the configuration of the operator ignition interface, a vehicle operator may provide an indication as to whether the engine is in an engine-on or engine-off condition, and further whether the vehicle is in a vehicle-on or vehicle-off condition.

Controller 12 may also receive an indication of the ignition status of engine 10 from an ignition sensor (not shown) coupled to the operator ignition interface. Control system 14 may be configured to send control signals to the actuators 81 based on input received from the sensors and the vehicle operator. The various actuators may include, for example, cylinder fuel injectors, an air intake throttle coupled to the engine intake manifold, a spark plug, etc. The actuator positions may be adjusted for optimal vehicle powertrain output during engine operation based on calibration data updated utilizing on-board data and/or off-board network data. Details of updating calibration data for optimal vehicle powertrain output are elaborated at FIGS. 3-5.

FIG. 2 depicts an example embodiment of a combustion chamber or cylinder of engine 10 (of FIG. 1). Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. As another example, input regarding a vehicle-on and/or engine-on condition may be received via driver ignition interface 15, as previously discussed with reference to FIG. 1. Cylinder (herein also "combustion chamber") 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 64 may be provided along an intake passage of the engine for varying the flow rate and/or pressure of intake air provided to the engine cylinders. For example, throttle 20 may be disposed downstream of compressor 174, or alternatively may be provided upstream of compressor 174.

Exhaust passage 148 can receive exhaust gases from other cylinders of engine 10 in addition to cylinder 30. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by a combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more injectors for providing a knock or pre-ignition suppressing fluid thereto. In some embodiments, the fluid may be a fuel, wherein the injector is also referred to as a fuel injector. As a non-limiting example, cylinder 30 is shown including one fuel injector 166. Fuel injector 166 is shown coupled directly to cylinder 30 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 30. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

Fuel may be delivered to fuel injector 166 from a high pressure fuel system 20 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 30.

As described above, FIG. 2 shows only one cylinder of a multi-cylinder engine. As such each cylinder may similarly include its own set of intake/exhaust valves, fuel injector(s), spark plug, etc.

Fuel tanks in fuel system 20 may hold fuel with different qualities, such as different compositions. These differences may include different alcohol content, different octane, different heat of vaporizations, different fuel blends, and/or combinations thereof etc. In one example, fuels with different alcohol contents could include one fuel being gasoline and the other being ethanol or methanol. In another example, the engine may use gasoline as a first substance and an alcohol containing fuel blend such as E85 (which is approximately 85% ethanol and 15% gasoline) or M85 (which is approximately 85% methanol and 15% gasoline) as a second substance. Other alcohol containing fuels could be a mixture of alcohol and water, a mixture of alcohol, water and gasoline etc.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. As discussed at FIG. 1, the vehicle control system which includes controller 12 may be communicatively coupled to an off-board network 13 such as a cloud computing system. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor. Engine speed signal, RPM, may be generated by controller 12 from signal PIP. Manifold pressure signal MAP from a manifold pressure sensor may be used to provide an indication of vacuum, or pressure, in the intake manifold. The controller may also receive operator input and indication regarding the ignition status of the engine from an operator ignition interface 15.

Storage medium read-only memory 110 can be programmed with computer readable data representing instructions executable by processor 106 for performing the methods described below as well as other variants that are anticipated but not specifically listed. Example routines are described herein with reference to FIGS. 3-5.

Figure 3:
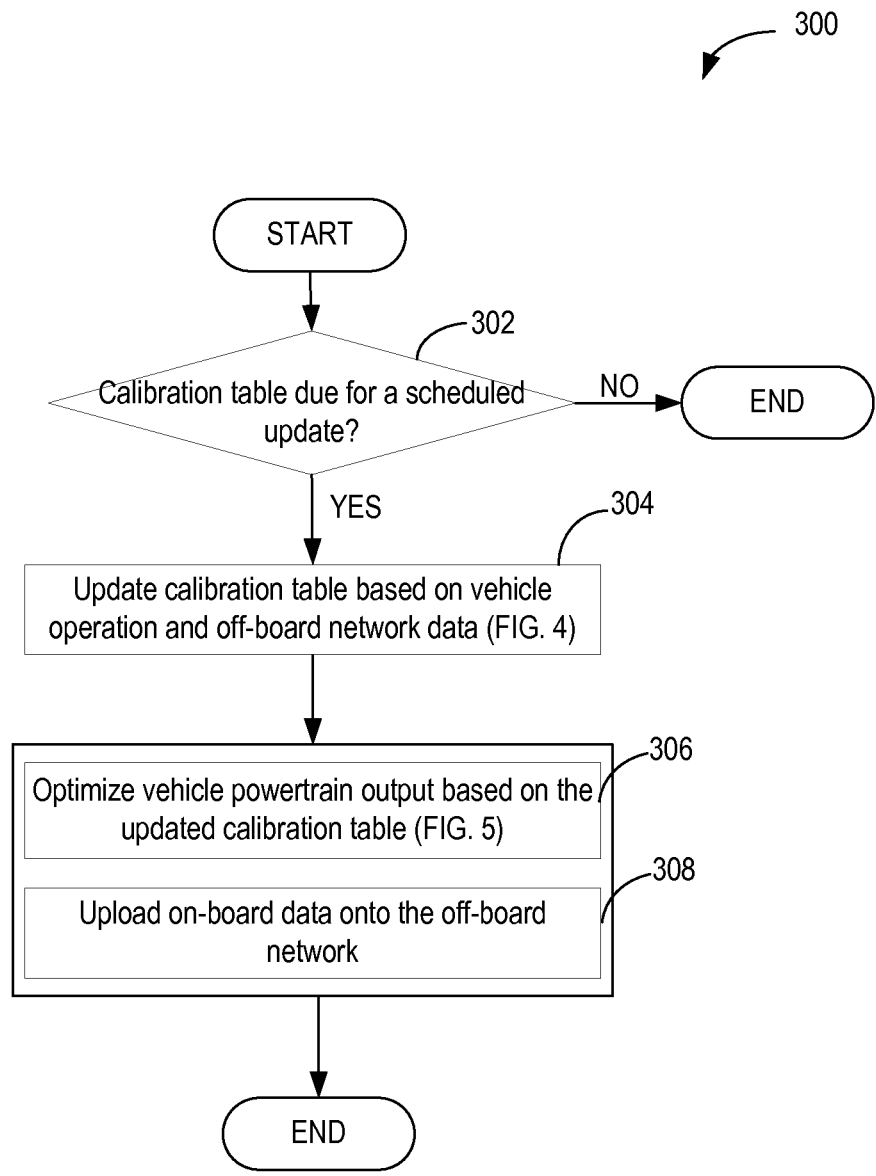
FIG. 3 shows a high level flow chart for adaptive calibration of a vehicle powertrain.

Turning to FIG. 3, it shows an example routine 300 which illustrates a method for adaptive calibration of a vehicle powertrain. While FIG. 3 shows an example method for updating one calibration table, the method may be applied to update one or more calibration tables, each pertaining to different aspects of vehicle operation.

Figure 4:
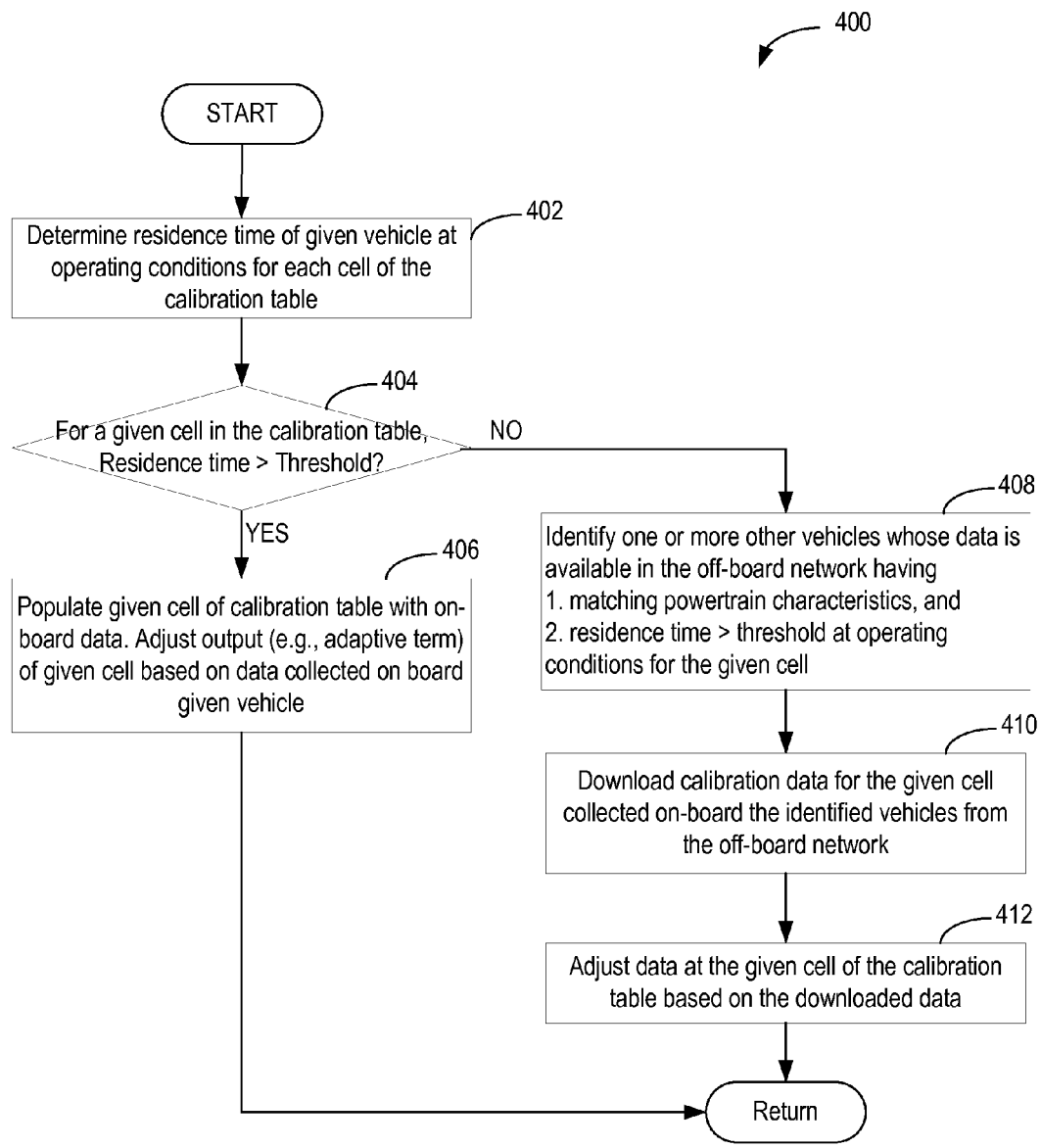
FIG. 4 shows a flow chart for updating a calibration table according to the present disclosure.

It will be further appreciated that the routines of FIGS. 3-4 depict cloud-based updating of a vehicle calibration table after the vehicle is in possession and use by a consumer. As such, this may constitute a second phase of cloud calibration. The vehicle may have undergone a similar cloud-based generating and updating of a calibration table during vehicle development at a manufacturer location. As such, this may constitute a first phase of cloud calibration. The first phase of calibration may be performed to achieve rapid calibration so that the vehicle can pass all emissions requirements before the vehicle is sold to the consumer. During the first phase, generation of a calibration table for an individual vehicle may be expedited using calibration data collected on-board a fleet of in-use vehicles of the same make and model. Therein, as in the second phase (elaborated at FIGS. 3-4), calibration data collected on-board each vehicle of the fleet may be uploaded to an off-board network, such as a cloud computing system. A controller of the vehicle undergoing calibration updates may download the relevant data from the off-board network and rapidly populate (or generate) an initial calibration table of the vehicle. The initial calibration table may then be further optimized as the operator uses the vehicle. During this second phase of calibration, the initial calibration table may be updated not only based on operator usage of the vehicle (that is, on-board collected data), but also based on data collected on-board one or more other vehicles communicatively coupled to the off-board network.

At 302, it may be determined if the calibration table is scheduled for an update. The calibration table may be periodically updated during operation of the vehicle by a consumer. In one example, the calibration table may be updated upon initiation of a vehicle drive cycle. In another example, the calibration table may be updated upon termination of a vehicle drive cycle. In yet another example, the calibration table may be intermittently updated upon elapse of a threshold duration or distance of vehicle operation since a last calibration update. In still other examples, the calibration table may be updated upon elapse of a predefined number of combustion cycles since an engine start. Therein, passage of combustion cycles may be counted at the vehicle controller and when the predefined number of combustion cycles have elapsed, data accumulated over the predefined number of combustion cycles may be used to update the calibration table. In addition, the data accumulated over the number of combustion cycles may be uploaded to an off-board network, in real-time, as discussed below. In still another example, the calibration table may be updated based on input from an on-board navigational device. As such, updating the calibration table may be performed automatically, that is, without input from the consumer. Further, updating the calibration table may be performed based on availability and connectivity to the network. It will be appreciated that one or more additional calibration tables, each pertaining to different aspects of vehicle operation, may be likewise updated.

Upon determining that the calibration table is due for a scheduled update, at 304 the calibration table may be updated based on data collected and stored on-board the vehicle during operation of the vehicle, and off-board network data. The on-board data may include data collected during vehicle operation and stored locally on the vehicle controller's memory, such as in the keep alive memory. By storing the data locally, it can be accessed quickly and used to expedite updating of the vehicle's powertrain calibration table. As used herein, the off-board network data may correspond to data downloaded from an off-board network. The off-board network may be a cloud computing system (herein also referred to as a data cloud) communicatively coupled to the vehicle control system. The data downloaded from the cloud computing system may have been collected on-board one or more other vehicles communicatively coupled to the data cloud. Details of updating the calibration table will be further elaborated at FIG. 4. As elaborated therein, data collected on-board a plurality of similar vehicles allows for faster adaptation of the calibration table because of all the various drive cycles the fleet of vehicles are operated in.

Once the updating of the calibration table is completed, at 306, vehicle powertrain output may be optimized based on the updated calibration table. As such, vehicle powertrain output may include one or more of engine output, engine actuator output, transmission output, transmission actuator output, as well as battery state-of-charge, electric motor controls, and one or more machines packaged to store and release energy in a hybrid vehicle context. Optimization of vehicle powertrain output will be further elaborated at FIG. 5. Further, at 308, data collected on-board the vehicle during the given vehicle drive cycle may be uploaded onto the off-board network. In one example, data from the updated calibration table may be uploaded onto the off-board network. The data may be uploaded automatically, without operator input (e.g., without requiring a prompt from the vehicle operator). For example, the data may be automatically uploaded following each drive cycle of the vehicle. Alternatively, the data may be uploaded in real-time to the data cloud intermittently, such as after a threshold distance of vehicle travel, after a threshold duration of vehicle travel, after a threshold number of engine combustion cycles, etc.

It will be appreciated that while FIG. 3 shows data generated on-board a given vehicle being transmitted to and uploaded onto an off-board network (e.g., a data cloud), data generated on-board one or more other vehicles (such as each vehicle of a fleet of vehicles on the road) may be similarly transmitted to and uploaded onto the off-board network. The data may then be stored at the network and shared between all the vehicles communicating with the network. That is, each vehicle may have access to data collected on-board all the other vehicles of the fleet via the network.

Turning to FIG. 4, it shows an example routine 400 which illustrates a method for adaptive learning of the calibration table based on data collected on-board the vehicle during operation of the vehicle and data downloaded from an off-board network system such as a cloud computing system. The calibration table may include a plurality of cells and each cell may correspond to at least two operating conditions. The operating conditions may include at least two of engine speed, engine load, engine temperature, barometric pressure, fuel alcohol content, ambient humidity, ambient temperature, and hybrid battery state-of-charge. Still other operating conditions may include fuel octane, fuel station, time spent in engine run mode or vehicle run mode, time spent with engine shut off or vehicle shut-off, ambient temperature, towing, mileage, age of vehicle, service history, etc.

The output of each cell may correspond to an actuator adjustment or adaptation that is used to optimize vehicle powertrain output at the specified operating conditions. As an example, a cell may correspond to engine speed and engine load conditions and the output of the cell may include an adaptation for cylinder valve timing, cam timing, spark timing, EGR rate, fuel injection amount, and/or fuel injection timing.

At 402, the controller may determine a residence time of the vehicle at operating conditions in each cell of a calibration table. The residence time of the vehicle at a cell may be based on duration of operation of the vehicle at the corresponding operating conditions over a given number of engine cycles, drive cycles, etc. Since the operating conditions may vary over various drive cycles, the residence time of the vehicle at operating conditions for each cell may also vary. The variation may be further based on the driving behavior of the vehicle operator, the route of vehicle operation, the geographical location of vehicle operation, climatic conditions, etc. As the duration of vehicle operation at the specific operating conditions increases, the residence time for that cell may increase. For example, a vehicle operating for longer durations of time on the highway may have higher residence times at high speed and load conditions compared to a vehicle operating in in-city driving conditions. On the other hand, the vehicle with more in-city driving may have higher residence times at low speed and load conditions compared to the vehicle driving on the highway.

In alternate examples, instead of determining a residence time, a confidence level associated with the residence time of the data point may be determined. Since the confidence of data gathered on-board a given vehicle in a given operating area is based on the residence time of the vehicle in that operating area, there may be areas of a vehicle's calibration table, where the on-board gathered data is of low confidence. This reduces the controller's ability to reliably optimize the vehicle's powertrain output. In addition, if there are not enough on-board data samples collected and averaged over a plurality of engine speed-load points, the calibration table of the vehicle cannot be populated with sufficient confidence. On the other hand, there may be actuator control regions that can use data with low confidence levels or low residence times if the error from the estimation has little effect on control. The inventors have recognized that by using global data collected on-board one or more other vehicles, data collected over multiple drive cycles of matching vehicles can be advantageously used to populate a given vehicle's calibration table, improving the confidence value of data used to optimize vehicle powertrain output. In addition, there may be enough data samples with higher confidence.

Upon determining residence time for each cell in the calibration table, at 404 the controller may determine if the residence time at operating conditions for a given cell is greater than a residence time threshold. It will be appreciated that in some examples, the residence time may be learned as number of combustion cycles elapsed at a given operating condition rather than an absolute duration of operation at the given operating condition. For example, at high engine speeds, more combustion cycles occur in a shorter amount of time, making the number of combustion cycles a more important aspect. Thus in one example, it may be determined if the vehicle has spent more than 300 combustion cycles at the operating conditions for the given cell to statistically determine that a confidence interval has been obtained. In one example, based on the confidence interval, a possible deviation from the confidence interval, and an expected effect of the deviation on the control of a specific actuator, the controller may determine an expected accuracy of control. Based on the expected accuracy being sufficiently high, the controller may decide to use the network data.

If it is determined that the residence time at operating conditions for the given cell is greater than the threshold, at 406, the controller may populate the given cell with data collected on-board the vehicle. For example, the controller may adjust the output of the given cell only with the data collected on-board the vehicle. For example, where the output of the given cell is an adaptive gain term, the controller may adjust the value of the adaptive gain term based on the data collected on-board the vehicle. If the residence time is not greater than the threshold, the routine may proceed to 408.

In alternate examples, the controller may determine a sample size of the given cell. For example, a number of data samples or data points available for the given cell may be determined. If the number of samples is greater than a threshold sample size, the controller may adjust the value of the adaptive gain term based on the data collected on-board the vehicle. Else, the routine may proceed to 408.

At 408, the vehicle controller may communicate with an off-board network such as a cloud computing system, and download calibration data for the given cell from one or more vehicles having residence time greater than the threshold at operating conditions for the given cell. As such, the data may be downloaded from one or more (other) vehicles having powertrain configurations matching those of the given vehicle. For example, there may be data generated on-board one or more other vehicles with matching powertrain configuration that is relayed to and stored at the off-board network. The controller may identify one or more other vehicles with matching powertrain configurations and further identify if any of those vehicles have the corresponding cell(s) of their calibration table filled with data collected while operating with a residence time greater than the threshold in the corresponding operating region. The controller may also note the residence time for each of those vehicles at the operating conditions corresponding to the given cell. It will be appreciated that in alternate embodiments, the data processing and calculations may be performed at the off-board network instead of at the vehicle controller level. Therein, the greater computing power of the off-board network and cloud computing system would allow for faster build-up of calibration tables for vehicles with similar operating conditions. In addition, issues associated with peer to peer communication, such as the calibration for one of the vehicles drifting off in a wrong direction due to mechanical wear or degradation, can be reduced.

For example, the off-board network may track all weather conditions (such as humidity) and, based on how the tracked weather parameter affects vehicle powertrain operation, the vehicle controller may back that affect out, apply current weather for the day, and adjust the data to download back to the vehicle. As another example, the off-board network may track local traffic conditions. The vehicle controller may then adapt the vehicle operation to the local traffic conditions. For example, the controller may adapt a pedal response curve based on heavy traffic conditions.

Next, at 410, calibration data for the given cell may be downloaded from the off-board network. In particular, data for the given cell collected on-board one or more other vehicles having higher than a threshold residence time at operating conditions for the given cell is downloaded from a cloud computing system.

In alternate examples, the confidence level or residence time of each cell may be compared to a confidence level threshold. If the confidence level threshold is exceeded, the on-board collected data may be considered reliable. In addition, as discussed above, for some regions of the calibration table, or some actuator control regions, data having residence time or confidence levels lower than the confidence level threshold may also be used if the error from the data collected in that cell has little to no effect on the control of the given actuator.

Next, at 412, the calibration table of the given vehicle may be adjusted based on the downloaded data. In one example, an average of the downloaded data collected on-board the one or more identified vehicles may be used to adjust the calibration table. In another example, a weight may be assigned to the off-board calibration data based on a residence time of each identified vehicle at the operating conditions for the given cell. The weighted data from all identified vehicles may be processed to determine values for the given cell in the calibration table. The assigned weight may be based on the absolute residence time of each vehicle at the operating conditions for the given cell. Alternatively, the assigned weight may be based on the residence time relative to the threshold, or the residence time of each identified vehicle relative to the residence time of the given vehicle (having less than threshold residence time). For example, as the residence time for a vehicle identified from a fleet of vehicles on the off-board network exceeds the residence time of the vehicle undergoing calibration updates, the weightage of data collected on-board the identified vehicle may be increased. As such, the off-board network may track individual vehicles as well as the quality of data received from each vehicle. Further, a history of calibration changes may also be monitored, and outliers may be identified for calibrations that want to revert to values outside a network identified threshold. The outliers may not be used for calibration table updating. In addition to the residence time, the weighting factor may also be based on the amount of data samples available. Based on the residence time and the amount of data samples available, a confidence value may be calculated and the weighting factor may be adjusted based on the confidence value. Thus, data samples downloaded from the off-board network having a higher confidence value may be weighted more while those having a lower confidence value may be weighted less.

As elaborated below, the weighting factor may be further based on one or more other vehicle conditions such as a location of the vehicle. For example, the weighting factor of data samples collected on-board one or more vehicles located closer to (e.g., within a threshold distance of) the given vehicle undergoing a calibration table update may be higher while the weighting of factor of data samples collected on vehicle located further (e.g., more than a threshold distance from the given vehicle) may be lower. As discussed above, the data processing and calculations may be performed at the off-board network instead of at the vehicle controller level. In one example, doing the calculations at the cloud computing system may lessen the risk of having an errant vehicle influence it neighbors with bad data. For example, calibrations can be normalized for local climatic conditions. Weather, altitude, humidity, etc, may be tracked at the cloud, the effects of the weather related parameters on vehicle performance backed out, and local effects applied and downloaded. Thus, the cloud computing system may essentially determine which data points collected on-board the fleet of vehicles is reliable for downloading and for calibration table updating.

Subsequently, the output of the given cell (which has on-board data with residence time less than threshold), may be adjusted with the downloaded off-board network data. For example, the cell may be populated with data based on data collected on-board one or more other vehicles having residence times greater than threshold for the given cell. In an alternate example, the output of the given cell may be adjusted based on a combination of data learned on-board the vehicle and the downloaded off-board network data. In this example, weight may be assigned to the on-board and off-board network data based on the residence time of the respective vehicles at the operating conditions of the given cell. The weighted on-board vehicle data and off-board network data may be processed to determine an output (e.g., an adaptive term) for the given cell. Herein, the on-board generated data may be assigned a lower weight while the off-board network data may be assigned a higher weight, the lower weight decreased as the residence time of the given vehicle reduces, the higher weight increased as the residence time of the corresponding vehicle increases. Thus, the contribution of each vehicle's data towards the calibration table update may be scaled based on the vehicle's residence time at specific operating conditions. In this way, values in each cell of the calibration table may be updated based on adaptive learning utilizing on-board vehicle data, off-board network data, or both. Upon residence time of the vehicle being less than threshold for a given cell, the updated value may be adjusted with data obtained from the off-board network, or a combination of on-board vehicle data and off-board network data. Upon residence time of the vehicle being greater than the threshold for a given cell, the updated value may be obtained based on on-board vehicle data only. As such, calibration tables may be normalized for local climatic conditions. For example, climatic conditions such as weather, altitude, humidity etc may be tracked for each vehicle. Effect of these variations in the downloaded data may be cancelled and local climatic conditions for the given vehicle may be applied. Steps 402-412 may be repeated for each cell of the vehicle's calibration table until the entire table has been sufficiently updated. After updating each cell of the calibration table, the routine may return to 306 at FIG. 3. The routine of FIG. 3 may likewise be repeated for multiple calibration tables, each controlling different aspects of the vehicle's operation.

As an example, data collected on-board a vehicle operated by a traveling salesman covering many miles and frequent highway trips may be used to "mature" the calibration table of another vehicle operated by a "grocery getter" on short in-city trips. Thus, the global data may be used to populate a majority of operating conditions and corresponding cells. Further, local adaptations could be done to fine tune a specific vehicle and make it more robust to vehicle-to-vehicle variability. For example, the controller may communicate with the off-board network in order to identify a set of vehicles in a fleet having longer residence time at selected operating conditions. The controller may then select a subset of vehicles from the set based on geographic location of the vehicles relative to a location of the given vehicle (where the calibration table is being updated). The controller may then update the calibration table based only on the data collected on-board the subset of vehicles. Alternatively, the controller may update the calibration table using data collected on-board all the identified vehicles, but with the data being weighted, the data collected on-board the subset of vehicles given higher weightage. In alternate examples, the selecting may be performed by the off-board network instead of at the controller level. As such, the cloud computing system may have the largest data set and a higher processing power. The cloud computing system may filter for quality of individual inputs and determine what data set is most appropriate and reliable for a particular vehicle, while establishing weighting for each data set. After the data set is selected for downloading by the cloud computing system, the vehicle controller may download the selected data and update the calibration table of the given vehicle.

In still further examples, the vehicle data cloud may store data pertaining to many additional aspects of vehicle performance and adaptation. As an example, data pertaining to fuel refilling may be stored and shared. Therein, the controller may transmit data regarding vehicle operating conditions at a time of refueling, a location of refueling, a specific fuel station where refueling occurred, as well as details of the fuel refilled into the fuel tank (e.g., fuel alcohol content, fuel octane, etc.), to the off-board network. The stored data may then be retrieved by other vehicles of the fleet when refueling at the same fuel station to adjust vehicle operation. For example, powertrain actuator settings for another vehicle refilling at the same fuel station may be adapted based on the stored data to better handle transients (e.g., torque transients) arising from fuel differences between the fuel available at the station and the current fuel in the vehicle's fuel tank.

It will be appreciated that while in some examples the calibration table is updated before vehicle optimization is initiated, in alternate examples, the vehicle may be started with a calibration table that is mature enough to allow basic driving and optimization. The table is then quickly updated with data downloaded from the data cloud. As such, this reduces the calibration effort of the vehicle controller. For example, the vehicle may be started and initially operated with a basic calibration table based only the on-board collected data for a number of engine cycles, and then the calibration table may be updated with data downloaded from the off-board network. In addition, during generation of the initial calibration table, during a first calibration phase, a basic calibration table may be populated with data collected on-board the vehicle during vehicle testing, the data collected for a number of engine cycles, and further populated with data downloaded from the off-board network, the downloaded data collected on-board a number of vehicles of the same or similar make and model being developed by the manufacturer (e.g., captive vehicles of the same make and model in the manufacturer's fleet being driven around by engineers during a development phase of the vehicle). In one example, the vehicle may adapt the calibration table within 2 emissions cycles worth of driving so that the vehicle can run a third emissions drive cycle and pass the emissions standard. This allows the vehicle to be rapidly made emissions compliant during the development phase at the manufacturer, and before the vehicle is sold to the consumer.

It will be further appreciated that while the routine of FIG. 4 depicts updating cells of a vehicle's calibration table with off-board network data when the vehicle has low residence time in those cells, in still further examples, cells where the vehicle has sufficient residence time may also be updated based on the off-board network data. For example, the vehicle controller may compare the residence time, and an associated confidence value, for data collected on-board the vehicle for a given cell with the residence time and associated confidence value for data collected on-board one or more other vehicles for the given cell. The one or more vehicles may be vehicles having matching characteristics and further being at a similar location (e.g., within a threshold distance of) as the given vehicle. If there are a plurality of vehicles and data samples available for the given cell, the vehicle controller may calculate how far the on-board data is from the average data sample of the plurality of vehicles to discriminate if the given vehicle is being operated far from the mean data. If so, the vehicle controller may enable specific diagnostic routines.

In one example representation, a vehicle controller may initiate one or more vehicle powertrain component diagnostics based on a comparison of data points of a cell of a vehicle powertrain calibration table collected on-board a vehicle with data points for the cell downloaded from an off-board network, the downloaded data collected on-board one or more other vehicles communicating with the network. The one or more other vehicles may have matching powertrain characteristics and may be located within a threshold distance of the given vehicle. The controller may compare a data point of the cell collected on-board the vehicle with a statistically significant average (e.g., mean, mode, median, weighted average, etc.) of the downloaded data. In response to a difference between the data point of the cell and the statistically significant average being higher than a threshold, a diagnostic routine may be initiated.

In another example representation, a vehicle controller may adjust data points of a vehicle powertrain calibration table using data collected on-board a vehicle and using a selected set of data downloaded from an off-board network, the downloaded data collected on-board one or more other vehicles communicating with the network. The selected set of data may be selected by a control module of the off-board network based on various factors.

In still another example representation, during a first calibration phase, data points of a vehicle powertrain calibration table may be adjusted using data collected on-board the vehicle during a vehicle testing and further adjusted using data downloaded from an off-board network, the downloaded data collected on-board one or more other vehicles (e.g., a fleet) communicating with the network, the one or more vehicles having matching powertrain configurations, the downloaded data collected while the one or more vehicles are being developed by the manufacturer. The first calibration phase may be performed while the vehicle is at a manufacturer location and before the vehicle is in use by a consumer.

A first, initial (or basic) calibration table may be generated at the end of the first calibration phase. In addition, data points of the first calibration table may be adjusted so that the vehicle is emissions compliant. Then, during a second calibration phase, data points of the vehicle powertrain calibration table may be adjusted using data collected on-board the vehicle during vehicle use by a consumer and further adjusted using data downloaded from the off-board network, the downloaded data collected on-board one or more other vehicles (e.g., a fleet) communicating with the network, the one or more vehicles having matching powertrain configurations, the downloaded data collected while the one or more vehicles are used by respective consumers. The second calibration phase may be performed after the vehicle has left the manufacturer location and while the vehicle is in use by the consumer. A second, updated calibration table may be generated at the end of the second calibration phase. In addition, data points of the second calibration table may be adjusted so that the vehicle is optimized for operator usage. During both the first and second calibration phases, data for downloading and use in calibration table adjusting may be selected at the off-board network. The selecting may be based on various factors such as quality of individual inputs, location of data collection, ambient weather conditions at time of data collection, history of data collection at each vehicle of the fleet, etc. The off-board network may establish a weighting factor for each data set collected on-board a vehicle of the fleet. The off-board network may then select one or more data sets for downloading into the calibration table of the particular vehicle, the selecting performed based on what is most appropriate and reliable for the particular vehicle. In this way, a vehicle controller may utilize calibration information from an off-board network to enhance or mature the given vehicle's calibration table under operating conditions in which the vehicle has insufficient on-board data. By utilizing data downloaded from an off-board network, and collected on-board one or more vehicles in communication with the off-board network, the calibration table can be updated faster and more reliably. Overall, the vehicle may adapt more quickly to variations in global and regional operating conditions.

Figure 5:
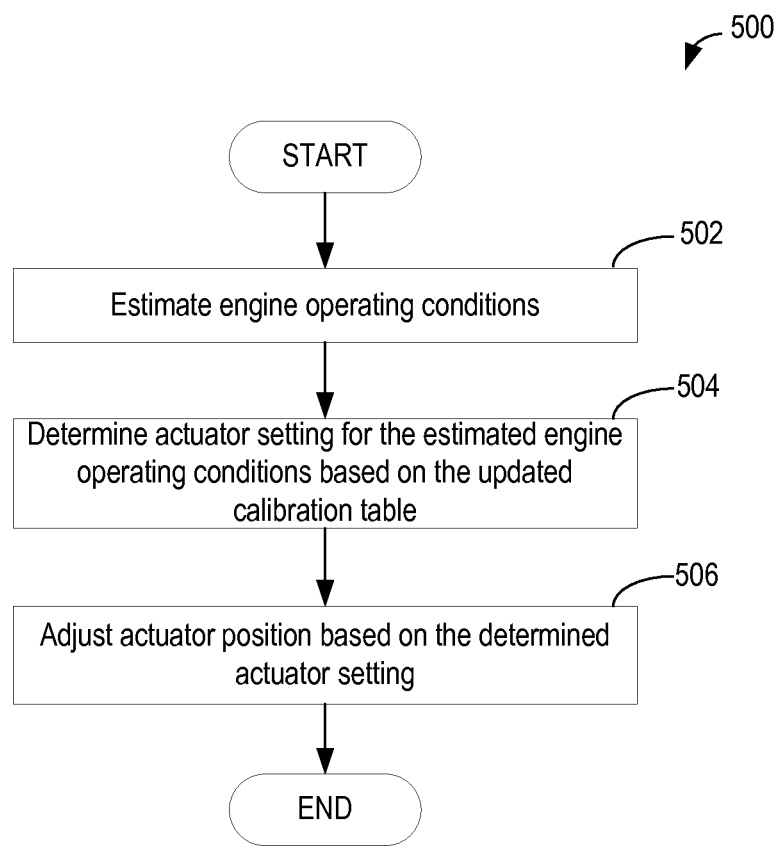
FIG. 5 shows a flow chart for adjusting vehicle powertrain output based on updated calibration table.
Figure 6:
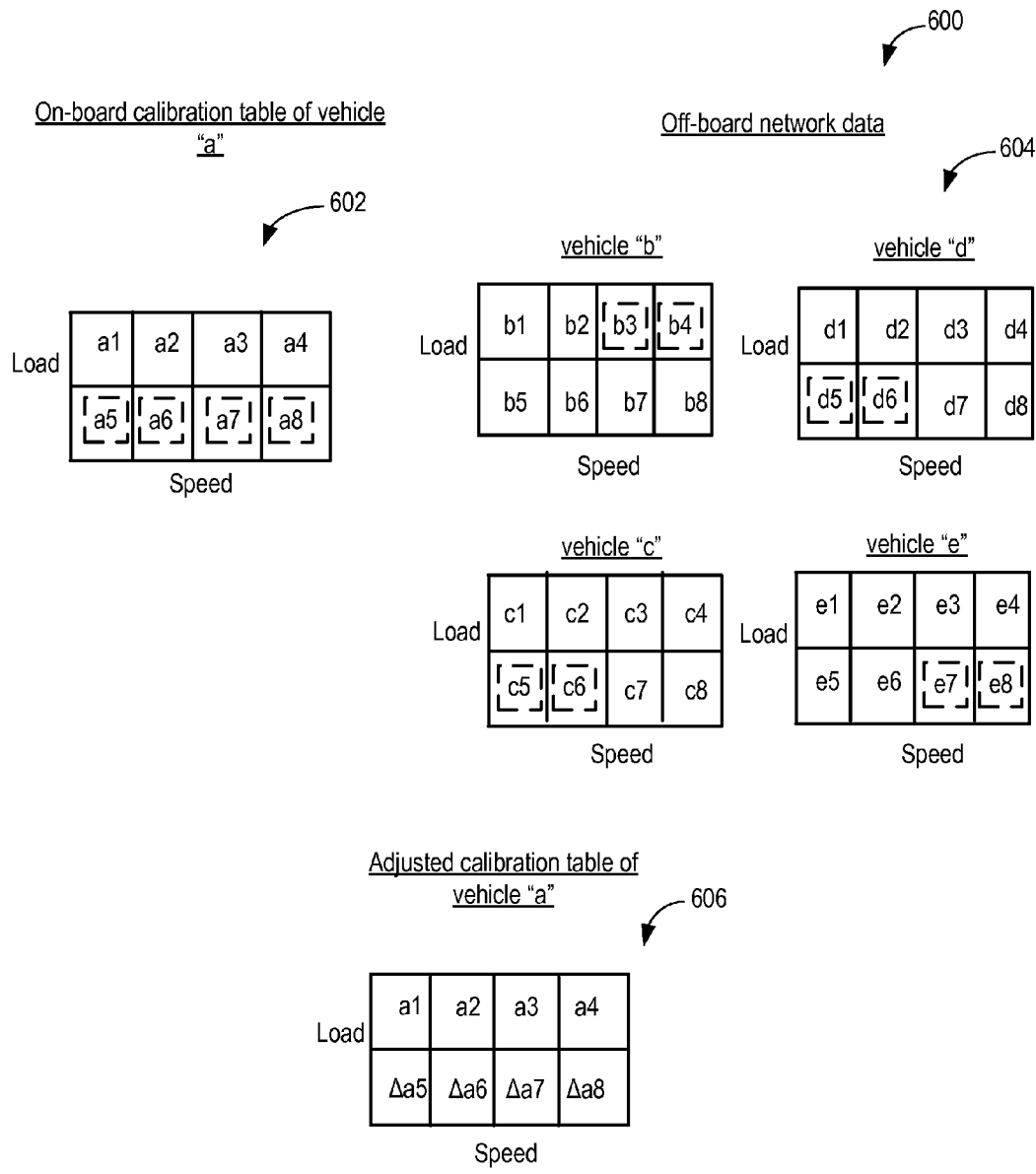
FIG. 6 shows an example adaptation of a calibration table.

FIG. 5 shows an example routine 500 which illustrates a method for adjusting a vehicle powertrain parameter such as an actuator setting to optimize vehicle powertrain output based on adaptive learning of the vehicle calibration table.

At 502, the controller may estimate and/or calculate engine operating conditions. These may include, for example, engine speed, engine temperature, operator torque demand, boost demand, ambient conditions, exhaust temperature, etc. Next, at 504, the controller may determine actuator settings for optimal vehicle powertrain output at the estimated operating conditions based on the updated calibration table. For example, the controller may determine the output of one or more cells of the updated calibration table corresponding to the estimated operating conditions. As such, the output of the cells may include vehicle powertrain output. Vehicle powertrain output may include one or more of engine output, transmission output, hybrid electric motor output and output of other machines used to store and release energy. For example, engine output may include one or more of scheduled engine speed and engine load, while transmission output may include one or more of a scheduled gear selection, a transmission shift schedule, transmission pressure control, and torque converter control. Hybrid electric motor output may include command torque output of the electric motor. The output of the cells as read by the controller may include absolute actuator settings or adaptation terms, such as an adaptive gain term for an actuator setting.

Next, at 506, the controller may adjust one or more vehicle powertrain actuators based on the determined settings. This includes adjusting one or more of engine actuator output, transmission actuator output, and hybrid electric motor output to optimize vehicle powertrain output. Engine actuator output settings adjusted may include one or more of valve timing, cam timing, injection timing, injection amount, spark advance, EGR rate, and boost pressure. Likewise, transmission actuator output settings adjusted may include one or more of a transmission gear selection, transmission clutch pressure, torque converter clutch pressure, electric oil pump pressure, line pressures, and solenoid response times, transmission line pressure, shift solenoid characteristics, torque convertor lock up or slip rates, etc. Hybrid electric motor output may include motor controller torque command.

In this way, global calibration data collected on one or more vehicles (e.g., of a fleet of vehicles having matching configurations) during vehicle use by respective consumers may be utilized to optimize the vehicle powertrain output of a given vehicle in use by its respective consumer. By uploading data collected on-board every vehicle onto an off-board network, the collective data can be shared between each vehicle of the fleet in communication with the off-board network. This allows each vehicle's calibration table to be matured with data collected on-board the given vehicle, as well as with data collected during operation of the other vehicles. In addition to storing calibration data and corresponding residence times, the off-board network may store additional vehicle performance and adaption data. For example, the off-board network may be utilized to store vehicle performance and adaptation information after fueling at a specific gas station. Another vehicle fueling at the same station could utilize the information from the previous vehicle to adapt to fuel differences from current in-tank conditions.

In one example, a method for adaptive calibration of vehicle powertrain output may comprise uploading data collected on-board each of a first and second vehicle having matching powertrain characteristics onto an off-board network; populating a first region of a first calibration table of the first vehicle using data collected on-board the first vehicle; and downloading data collected on-board the second vehicle from the off-board network to populate a second region of the first calibration table. The first region of the first calibration table corresponds to a first set of operating conditions and populating the first region using data collected on-board the first vehicle is in response to the first vehicle residing longer than a threshold amount of time at the first set of operating conditions. The second region of the first calibration table corresponds to a second set of operating conditions, different from the first set of operating conditions, and populating the second region using data collected on-board the second vehicle is in response to the first vehicle residing less than the threshold amount of time at the second set of operating conditions and the second vehicle residing longer than the threshold amount of time at the second set of operating conditions. The method may further comprise uploading data collected on-board a third vehicle having matching powertrain characteristics onto the off-board network; and further populating the second region of the first calibration table of the first vehicle using weighted data collected on-board the third vehicle, the weighted data based on a residence time of the third vehicle at the second operating conditions relative to each of the first vehicle and the second vehicle. Further, during operation of the first vehicle, settings for one or more powertrain actuators may be adjusted based on the first calibration table populated with data collected on-board each of the first and second vehicle.

Further, the data of the second and third vehicle could be averaged together. Further still, it may be possible to back out effects of data collected on-board the second and third vehicle on different powertrain combinations and then apply the adjusted data to different vehicle and powertrains. For example, gasoline purchased at a filling station by a vehicle having a V8 engine may have an effect on the operation of the engine, such as evaporation. This effect may be learned and understood. The "learned effect" could then be applied to a vehicle having an I4 engine when fueled at the same station knowing that it will effect it in a similar, known manner.

In still further representations, a method for adapting a vehicle calibration table includes adjusting data points of a vehicle powertrain calibration table using data collected on-board a vehicle over a number of drive cycles and using data downloaded from an off-board network, the downloaded data collected on-board one or more other vehicles communicating with the network over the number of drive cycles, wherein vehicle operating conditions covered by the vehicle over the number of drive cycles partially overlaps or does not overlap the vehicle operating conditions covered by the one or more other vehicles. The one or more vehicles may be selected based on a residence time at the vehicle operating conditions. The one or more vehicles may be further selected, or weighted, based on a location of operation relative to a location of the given vehicle's operation.

As another example, a method for updating a vehicle powertrain calibration table includes uploading data collected on-board each of a first, second, and third vehicle having matching powertrain characteristics onto an off-board network; populating a first region of a first calibration table of the first vehicle using data collected on-board the first vehicle; and downloading data collected on-board the second vehicle from the off-board network to populate a second region of the first calibration table during a first condition, while downloading data collected on-board the third vehicle from the off-board network to populate the second region of the first calibration table during a second condition. During the first condition, a residence time of the second vehicle at the second region of the first calibration table may be higher while during the second condition, a residence time of the third vehicle at the second region of the first calibration table may be higher.

Alternatively, the residence time of both the second and third vehicles may be higher, and during the first condition, the second vehicle may be selected due to a geographic location of the second vehicle relative to the first vehicle (e.g., the second vehicle being closer to or less than a threshold distance from the first vehicle). In comparison, during the second condition, the third vehicle may be selected due to a geographic location of the third vehicle relative to the first vehicle (e.g., the second vehicle being closer to or less than a threshold distance from the first vehicle). Further still, the residence time of both the second and third vehicles may be higher, and during the first condition, data collected on-board the second vehicle may be weighted higher than data collected on-board the third vehicle due to the geographic location of the second vehicle relative to the first vehicle (as compared to the relative location of the third vehicle). In comparison, during the second condition, data collected on-board the third vehicle may be weighted higher than data collected on-board the second vehicle due to the geographic location of the third vehicle relative to the first vehicle (as compared to the relative location of the second vehicle). Alternatively, the data processing may be performed at the off-board network level instead of at the vehicle controller level. Therein, the higher processing ability of the cloud computing system can be advantageously used to perform weighted averaging of data collected on-board many vehicles to find an optimum (e.g., "best") calibration.

In still another example, the controller may upload data collected on-board the third vehicle having matching powertrain characteristics onto the off-board network; and further populate the first region of the first calibration table of the first vehicle using weighted data collected on-board the third vehicle, the weighted data based on a residence time of the third vehicle at the second operating conditions relative to the first vehicle. The weighted data may be further based on a location of third vehicle relative to the first vehicle. For example, data collected on-board the first vehicle may be weighed higher when a difference between the data collected on on-board the first vehicle and the data collected on on-board the third vehicle is smaller. Else, when the difference is higher, the data collected on-board the third vehicle may be weighted higher. In addition, a powertrain component diagnostic routine may be initiated on the first vehicle in response to the difference being higher.

The steps of FIGS. 3-4 are further elaborated by an example calibration table update depicted at map 600 of FIG. 6. In particular, map 600 shows an example calibration table 602 of vehicle "a" prior to update by the vehicle controller, an example off-board network data set 604, and an updated calibration table 606 of vehicle "a". The off-board network data set may include data sets for vehicles "b", "c", and "d" which may have powertrain characteristics matching vehicle "a". Each calibration table may include a plurality of cells, each of the plurality of cells may correspond to at least two operating conditions, the operating conditions including at least two of engine speed, engine load, engine temperature, barometric pressure, fuel alcohol content, ambient humidity, and others. The calibration table data set shown herein is a 2D map plotted as a function of engine speed and load. The off-board network data set (including data for vehicles "b", "c", and "d") corresponds to speed-load region represented in the calibration table of vehicle "a". In some examples, calibration table may be plotted in a 3D map as a function of at least three operating conditions, the operating conditions including at least three of engine speed, engine load, engine temperature, barometric pressure, fuel alcohol content, ambient humidity, and others.

The calibration table may include on-board data points such as a1-a8 for vehicle "a", b1-b8 for vehicle "b", c1-c8 for vehicle "c", d1-d8 for vehicle "d", and e1-e8 for vehicle "e". As such, data points a1-a8 correspond to data points collected on-board vehicle "a" over multiple vehicle drive cycles, data points b1-b8 correspond to data points collected on-board vehicle "b" over multiple vehicle drive cycles, and so on for vehicles "c", "d" and "e". Each cell in the calibration table may include at least one data point. The data point may include an absolute actuator setting, an adaptive term, etc. Data sets for vehicles b, c, d, and e are present in the off-board network. Data set for vehicle "a" is an on-board data set collected when vehicle "a" was in operation by a consumer. Each cell may be associated with a set of operating conditions and the controller may further have information regarding the residence time of the given vehicle at the operating conditions for the given cell. As such, the residence time corresponds to the amount of time the vehicle has spent at the operating conditions corresponding to the given cell over one or more vehicle drive cycles. Data points collected on the vehicle at operating conditions of the cells with less than a threshold residence time are indicated in boxes outlined with broken lines. These data points may be less mature and may require further updating to make them more reliable. In comparison, data points collected on the vehicle at operating conditions of the cells with more than a threshold residence time are indicated in boxes without with broken lines. These data points may be more mature and may require less updating (or no further updating) to make them more reliable.

Prior to update, calibration table 602 of vehicle "a" may include data points a1-a8. Data points a1-a4 represent data collected in the speed-load region where vehicle "a" has operated for a duration greater than threshold. Consequently, data points a1-a4 were collected on the vehicle at longer residence times (greater than threshold). Data points a5-a8 represent data collected in the speed-load region where vehicle "a" has operated for a duration less than threshold. Consequently, data points a5-a8 may have been collected on the vehicle with lower residence times.

In the off-board network, vehicles "b", "c", "d", and "e" may have operated with residence times greater than threshold at operating conditions of cells corresponding to data points b1-b2, b5-b8, c1-c4, c7-c8, d1-d4, d7-d8, and e1-e6, respectively. That is, in the speed load region in which vehicle "a" has data points with residence times less threshold, at least one of vehicles "b", "c", and "d" have residence times greater than threshold. In other words, in the speed-load region in which vehicle "a" has not operated for duration greater than threshold, at least one of vehicles "b", "c", or "d" have operated for duration greater than threshold and hence have adapted calibration data for those regions.

During the calibration table update, since vehicle "a" at operating conditions of the cells with data points a1-a4 has residence times greater than threshold, the calibration table of vehicle "a" may be populated with on-board data points a1-a4 in those cells. However, vehicle "a" at operating conditions of cells with data points a5-a8 has residence times less than threshold. Consequently value of the cells with data points a5-a8 may be adjusted based on data from vehicles "b", "c", and "d" downloaded from the off-board network. For example, adjusted data point $\Delta a5$ may be a function of b5 and e5 since vehicles "b" and "e" at operating conditions of the cells with data points b5 and e5 have residence times greater than threshold. Similarly, adjusted data point $\Delta a6$ may be a function of b6 and e6, adjusted data point $\Delta a7$ may be function of b7, c7, and d7, and adjusted data point $\Delta a8$ may be a function of b8, c8, and d8. In one example, calibration table of vehicle "a" may be adjusted based on on-board data and off-board network data weighted according to their respective residence times. In this example, $\Delta a5$ may be a function of a5, b5, and e5, $\Delta a6$ may be a function of a6, b6, and e6, $\Delta a7$ may be a function of a7, b7, d7, and e7, and $\Delta a8$ may be a function of a8, b8, c8, and d8.

In one example, the calibration table may be adjusted based on an optimized set (e.g., statistical average) of data points downloaded from the off-board network at operating conditions of a given cell. In another example, based on the number of data points available for operating conditions of a given cell in the off-board network, a confidence value may be calculated. Further, based on the confidence value, a weight may be assigned to the data point and weighted average of all data points at operating conditions of a given cell may be calculated. In still another example, the calibration table may be updated based on confidence value for data collected on-board. In this example, a confidence value may be assigned to a data point for a given cell based on operation of the vehicle at operating conditions of the given cell. The confidence value of the on-board data point may be compared to a confidence value of each data point in the off-board network at operating conditions of the given cell to determine the difference between the confidence value of the on-board data and confidence value of the off-board network data. If the difference is greater than threshold, the data (on-board data or off-board data) with higher confidence value may be utilized to update the calibration table. If the difference is lesser than threshold, an average of on-board data and off-board data may be calculated to update the calibration table.

In this way, data collected on-board a plurality of vehicles, and shared there-between via a network, can be advantageously used to expedite updating of a vehicle's calibration table. In particular, because of all the various drive cycles the fleet of vehicles is operated in, a wide variety of operating conditions, can be covered in a shorter amount of time. By utilizing off-board network data to optimize on board calibration table for a particular vehicle, calibration table for the vehicle (operated in a narrow range of operating conditions) may be matured for operation in a broader range of operating conditions. By using weighted global data to adjust individual cells of a given vehicle's powertrain calibration table, an average adaptation time can be reduced while improving powertrain calibration accuracy.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine controller of a vehicle, the method comprising:
adjusting, with the engine controller, data points of a vehicle powertrain calibration table stored in memory communicatively coupled to the engine controller using data collected on-board the vehicle via signals received at the engine controller from one or more sensors coupled to an engine of the vehicle and using data downloaded from an off-board network, the data downloaded from the off-board network collected on-board one or more other vehicles communicating with the off-board network; and
performing an adjustment of an actuator in the vehicle based on one or more of the adjusted data points of the vehicle powertrain calibration table,
wherein adjusting data points of the calibration table includes, when a first residence time of the vehicle at operating conditions for a given cell of the calibration table is higher than a threshold, populating the calibration table with data collected on-board the vehicle at operating conditions for the given cell.

2. The method of claim 1, wherein adjusting data points includes adjusting each data point of the vehicle powertrain calibration table, and wherein each data point of the powertrain calibration table includes one of an engine output and a transmission output.

3. The method of claim 1, wherein data collected on-board the vehicle includes data collected on-board the vehicle in use by a consumer, and wherein the data downloaded from the off-board network is collected on-board one or more other vehicles in use by respective consumers.

4. The method of claim 1, wherein the calibration table includes a plurality of cells, each of the plurality of cells corresponding to at least two operating conditions, the at least two operating conditions including at least two of engine speed, engine load, engine temperature, barometric pressure, fuel alcohol content, ambient humidity, and fuel octane.

5. The method of claim 1, wherein adjusting data points of the calibration table further includes, when the first residence time of the vehicle at the operating conditions for the given cell is lower than the threshold, downloading data collected for the given cell on-board one or more other vehicles having a second residence time higher than the threshold at the operating conditions for the given cell, and populating the given cell of the calibration table based on the downloaded data.

6. The method of claim 1, wherein the off-board network includes a cloud computing system.

7. The method of claim 1, wherein said vehicle is also communicating with the off-board network, further comprising, uploading data collected on-board said vehicle onto the off-board network.

8. The method of claim 1, wherein an output of the vehicle powertrain calibration table includes one of engine output, engine actuator output, transmission output, transmission actuator output, and hybrid electric motor output.

9. The method of claim 8, wherein the engine output includes one or more of engine speed and engine load, wherein the engine actuator output includes one or more of valve timing, cam timing, injection timing, injection amount, exhaust gas recirculation rate, fuel injection split ratio, spark advance, and boost pressure, wherein the transmission output includes one or more of gear selection, and shift schedule, and wherein the transmission actuator output includes one or more of transmission line pressure, shift solenoid characteristics, torque converter lock-up rate, transmission clutch slippage rate.

10. The method of claim 1, wherein the one or more other vehicles have powertrain characteristics matching the powertrain characteristics of said vehicle, and wherein the adjusting includes automatically adjusting during initiation of a vehicle drive cycle, termination of a vehicle drive cycle, or during a scheduled update.

11. The method of claim 1, further comprising, during vehicle operation, adjusting one or more engine and powertrain actuators based on engine operating conditions and further based on the adjusted vehicle calibration table.

12. A method, comprising:
for each of a first and second vehicle having matching powertrain characteristics, uploading, with an engine controller for that vehicle, data collected on-board that vehicle onto an off-board network;
populating, with the engine controller of the first vehicle, a first region of a first calibration table stored in memory of the first vehicle using data collected on-board the first vehicle;
downloading, with the engine controller of the first vehicle and from the off-board network, data collected on-board the second vehicle to populate a second region of the first calibration table stored in memory of the first vehicle; and
performing an actuator adjustment of one or more actuators of the first vehicle based on an output of one or more cells of the first calibration table,
wherein the first region of the first calibration table corresponds to a first set of operating conditions and wherein populating the first region using data collected on-board the first vehicle is in response to the first vehicle residing longer than a threshold amount of time at the first set of operating conditions.

13. The method of claim 12, wherein the second region of the first calibration table corresponds to a second set of operating conditions, different from the first set of operating conditions, and wherein populating the second region using data collected on-board the second vehicle is in response to the first vehicle residing less than the threshold amount of time at the second set of operating conditions and the second vehicle residing longer than the threshold amount of time at the second set of operating conditions.

14. The method of claim 13, further comprising,
uploading data collected on-board a third vehicle having matching powertrain characteristics onto the off-board network; and
further populating the second region of the first calibration table of the first vehicle using weighted data collected on-board the third vehicle, the weighted data based on a residence time of the third vehicle at the second set of operating conditions relative to each of the first vehicle and the second vehicle.

15. The method of claim 14, wherein the calibration table is a vehicle powertrain calibration table, the method further comprising, during operation of the first vehicle, adjusting settings for one or more powertrain actuators based on the first calibration table populated with data collected on-board each of the first and second vehicle.

16. A vehicle system, comprising:
an engine;
a powertrain coupled between the engine and vehicle wheels;
one or more actuators configured to vary a powertrain output;
a communication module for communicatively coupling the vehicle system to an off-board cloud network; and
a controller with computer readable instructions included on non-transitory memory for:
storing data generated on-board the vehicle locally while also uploading the on-board generated data to the off-board cloud network;
based on operating conditions at which data was generated on-board the vehicle, and further based on a residence time of the vehicle at the operating conditions, populating one or more cells of a powertrain calibration table; and
downloading data corresponding to unpopulated cells of the powertrain calibration table from the off-board cloud network, the downloaded data generated on-board one or more other vehicles; and
adjusting settings for the one or more actuators based on the calibration table.

17. The system of claim 16, wherein populating based on operating conditions and the residence time of the vehicle includes populating a cell with the on-board generated data if a first residence time of the vehicle at an operating condition corresponding to the cell is higher than a threshold amount, and not populating the cell with the on-board generated data if the first residence time of the vehicle at an operating condition corresponding to the cell is lower than the threshold amount.

18. The system of claim 17, wherein the downloading includes downloading data generated on-board one or more other vehicles having a higher than threshold amount of residence time at operating conditions corresponding to unpopulated cells of the calibration table, the one or more other vehicles have powertrain characteristics that match those of said vehicle.

* * * * *